(12) United States Patent
Shichino (10) Patent No.: US 12,322,985 B2
(45) Date of Patent: Jun. 3, 2025

(54) POWER RECEIVING APPARATUS, CONTROL METHOD OF POWER RECEIVING APPARATUS, AND STORAGE MEDIUM

(71) Applicant: CANON KABUSHIKI KAISHA, Tokyo (JP)

(72) Inventor: Takahiro Shichino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/354,548

(22) Filed: Jul. 18, 2023

(65) Prior Publication Data

US 2023/0369918 A1    Nov. 16, 2023

Related U.S. Application Data

(63) Continuation of application No. 18/049,951, filed on Oct. 26, 2022, now Pat. No. 11,784,515, which is a continuation of application No. 17/343,505, filed on Jun. 9, 2021, now Pat. No. 11,502,556, which is a (Continued)

(30) Foreign Application Priority Data

Dec. 14, 2018 (JP) ................. 2018-234711

(51) Int. Cl.
| | |
|---|---|
| *H04B 5/79* | (2024.01) |
| *H02J 50/23* | (2016.01) |
| *H02J 50/80* | (2016.01) |
| *H04W 4/80* | (2018.01) |
| *H04W 76/14* | (2018.01) |

(52) U.S. Cl.
CPC ............. *H02J 50/80* (2016.02); *H02J 50/23* (2016.02); *H04B 5/79* (2024.01); *H04W 4/80* (2018.02); *H04W 76/14* (2018.02)

(58) Field of Classification Search
CPC ..... G06Q 20/32; G06Q 20/3278; H02J 50/12; H02J 50/60; H02J 50/40; H02J 50/80; H02J 50/23; H02J 7/00034; H02J 50/10; H04B 5/79; H04B 5/72; H04B 5/24; H04W 4/80; H04W 76/14
See application file for complete search history.

(56) References Cited

U.S. PATENT DOCUMENTS

| | | | | |
|---|---|---|---|---|
| 11,356,145 B2* | 6/2022 | Lee | .................. | H02J 50/80 |
| 2010/0315686 A1* | 12/2010 | Hong | ................ | H04N 1/0044 |
| | | | | 358/442 |

(Continued)

FOREIGN PATENT DOCUMENTS

| | | |
|---|---|---|
| JP | 2014075857 A | 4/2014 |
| JP | 2017085700 A | 5/2017 |

(Continued)

*Primary Examiner* — Cindy Trandai
(74) *Attorney, Agent, or Firm* — Canon U.S.A., Inc. IP Division (57) ABSTRACT

A control unit 201 of a power receiving apparatus 200 performs a predetermined communication to a power transmitting apparatus 100 via a first communication unit 204 such that power transfer from the power transmitting apparatus 100 is continued, in a case where a control communication using the first communication unit 204 is switched to a control communication using a second communication unit 202.

13 Claims, 7 Drawing Sheets

Related U.S. Application Data continuation of application No. PCT/JP2019/041915, filed on Oct. 25, 2019.

(56) References Cited

U.S. PATENT DOCUMENTS

| | | | |
|---|---|---|---|
| 2012/0202435 A1* | 8/2012 | Kim | H02J 50/80 |
| | | | 455/69 |
| 2014/0361735 A1* | 12/2014 | Li | H02J 50/12 |
| | | | 320/108 |
| 2014/0375138 A1* | 12/2014 | Sako | B60L 53/65 |
| | | | 307/104 |
| 2017/0118328 A1* | 4/2017 | Ishikawa | G06Q 20/065 |
| 2018/0138759 A1 | 5/2018 | Onishi | |
| 2018/0183267 A1* | 6/2018 | Lin | H02J 7/0047 |
| 2018/0309314 A1* | 10/2018 | White, II | H02J 50/12 |
| 2019/0140469 A1 | 5/2019 | Lee | |
| 2019/0181697 A1* | 6/2019 | Malkin | H02J 50/12 |
| 2021/0167817 A1 | 6/2021 | Shichino | |
| 2021/0242725 A1* | 8/2021 | Tachiwa | H02J 50/80 |
| 2021/0408838 A1* | 12/2021 | Park | H02J 7/00034 |
| 2022/0277285 A1* | 9/2022 | Lim | G06Q 20/3278 |

FOREIGN PATENT DOCUMENTS

| | | |
|---|---|---|
| JP | 2017184383 A | 10/2017 |
| WO | 2018147090 A1 | 8/2018 |
| WO | 2020090421 A1 | 5/2020 |

* cited by examiner

POWER RECEIVING APPARATUS, CONTROL METHOD OF POWER RECEIVING APPARATUS, AND STORAGE MEDIUM

CROSS-REFERENCE TO RELATED APPLICATIONS

This application is a Continuation of U.S. patent application Ser. No. 18/049,951, filed Oct. 26, 2022, which is a Continuation of U.S. patent application Ser. No. 17/343,505, filed Jun. 9, 2021, which is a Continuation of International Patent Application No. PCT/JP2019/041915, filed Oct. 25, 2019, which claims the benefit of Japanese Patent Application No. 2018-234711, filed Dec. 14, 2018, all of which are hereby incorporated by reference herein in their entireties.

BACKGROUND

Field

The present disclosure relates to a power receiving apparatus, a control method of the power receiving apparatus, and a storage medium.

Background Art

Technology development of wireless power transfer systems has widely been conducted. PTL 1 discloses a power transmitting apparatus and a power receiving apparatus that comply with a standard (WPC standard) defined by Wireless Power Consortium (WPC), which is a non-contact charging standard standardization body. These power transmitting apparatus and power receiving apparatus exchange control information necessary for power transfer by communication in which the information is superimposed on the power to be transmitted and received.

PTL 2 discloses a technique of communicating a control signal, which is executed between a power transmitting apparatus and a power receiving apparatus to control transmitted power, by communication using a communication unit via a frequency and a coil (or antenna) different from those of a power transmitting unit and a power receiving unit.

CITATION LIST

Patent Literature

PTL 1: Japanese Patent Laid-Open No. 2016-007116
PTL 2: Japanese Patent Laid-Open No. 2012-217224

Control communication in a wireless power transfer system includes a packet with a small data amount and a packet with a large data amount. However, in the prior art, in a wireless power transfer system capable of performing communication using a plurality of communication units, those packets are not transmitted and received by selectively using the plurality of communication units.

SUMMARY

The present disclosure has been made in consideration of the above problem, and provides a technique that enables suitable control of a plurality of communication units during wireless power transfer.

According to one aspect of the present disclosure, there is provided a power receiving apparatus comprising a power receiving unit configured to wirelessly receive power from a power transmitting apparatus, a first communication unit configured to perform control communication of wireless power transfer with the power transmitting apparatus, a second communication unit configured to perform control communication of wireless power transfer with the power transmitting apparatus using a method different from a method used by the first communication unit, and a control unit configured to perform, in a case where the control communication using the first communication unit is switched to the control communication using the second communication unit, predetermined communication with the power transmitting apparatus via the first communication unit so that power transmission from the power transmitting apparatus is continued.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the disclosure and, together with the description, serve to explain principles of the disclosure.

DESCRIPTION OF THE EMBODIMENTS

Embodiments will be described below with reference to accompanying drawings. Note that the arrangements shown in the embodiments to be described below are merely examples, and the present disclosure is not limited to the illustrated arrangements.

<Arrangement of Power Transmitting Apparatus>

Figure 1:
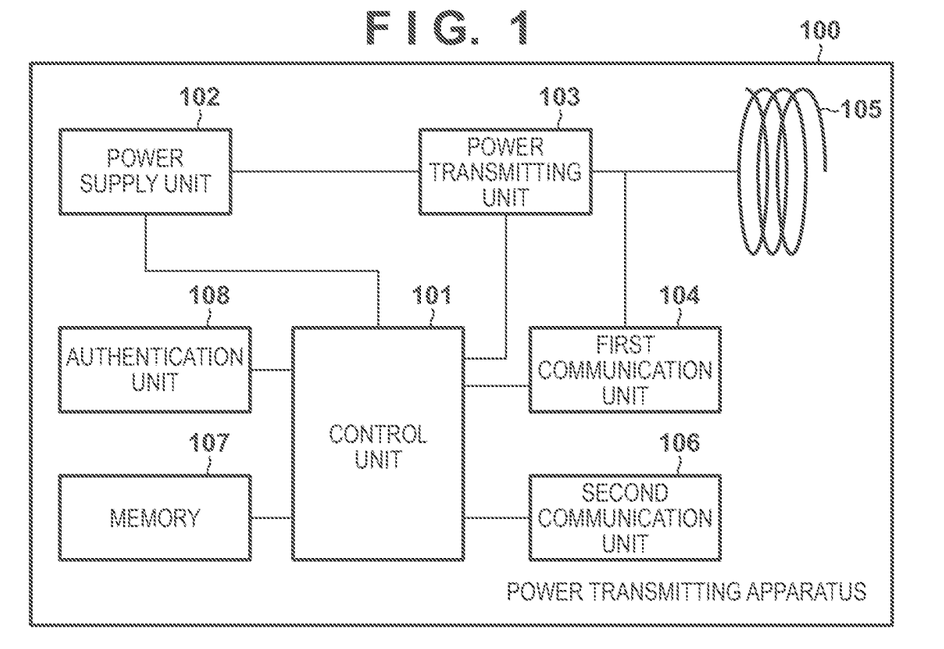
FIG. 1 is a block diagram showing an arrangement example of a power transmitting apparatus according to an embodiment.

FIG. 1 is a block diagram showing an arrangement example of a power transmitting apparatus applicable to a wireless power transfer system according to an embodiment. A power transmitting apparatus 100 complies with the WPC standard, and supports a device authentication protocol. Note that it is described in this embodiment that the power transmitting apparatus and the power receiving apparatus comply with the WPC standard, but the present disclosure is not limited to this, and they may comply with another wireless power transfer standard.

The power transmitting apparatus 100 includes a control unit 101, a power supply unit 102, a power transmitting unit 103, a first communication unit 104, a power transmitting coil 105, a second communication unit 106, a memory 107, and an authentication unit 108. The control unit 101 controls the overall power transmitting apparatus 100. An example of the control unit 101 is a CPU (Central Processing Unit). The power supply unit 102 supplies power for operating at least the control unit 101 and the power transmitting unit 103. The power transmitting unit 103 generates an AC voltage and an AC current to be transferred, via the power transmitting coil 105, to a power receiving apparatus 200 which will be described later with reference to FIG. 2. More specifically, the power transmitting unit 103 converts the DC voltage supplied by the power supply unit 102 into an AC voltage by a switching circuit having a half-bridge or full-bridge configuration using an FET (Field Effect Transistor). The power transmitting unit 103 includes a gate driver that controls ON/OFF of the FET. The power transmitting unit 103 has a power supply capability of outputting, for example, a power of 15 W to a charging unit of the power receiving apparatus 200 corresponding to the WPC standard.

The first communication unit 104 performs control communication of wireless power transfer based on the WPC standard with a communication unit (a first communication unit 204 in FIG. 2) of the power receiving apparatus 200. In this embodiment, the communication performed by the first communication unit 104 is communication in which the AC voltage or current generated by the power transmitting unit 103 is modulated and a signal used for wireless power transfer is superimposed thereon. Hereinafter, the communication performed between the first communication unit 104 and the communication unit (the first communication unit 204 in FIG. 2) of the power receiving apparatus 200 is referred to as first communication.

The second communication unit 106 performs control communication of wireless power transfer based on the WPC standard with a communication unit (a second communication unit 202 in FIG. 2) of the power receiving apparatus 200. The communication performed by the second communication unit 106 is communication using a frequency different from the frequency of the power transmitting unit 103, and uses an antenna (not shown) different from the power transmitting coil 105. In this embodiment, the second communication unit 106 is described to operate as a Peripheral of Bluetooth Low Energy (BLE). However, the second communication unit 106 may be a Central of BLE, or may use Near Field Communication (NFC), Wi-Fi, or the like. In this embodiment, the second communication unit 106 can perform higher-speed communication than the communication performed by the first communication unit 104. Hereinafter, the communication performed between the second communication unit 106 and the communication unit (the second communication unit 202 in FIG. 2) of the power receiving apparatus 200 is referred to as second communication.

The second communication unit 106 is controlled by the control unit 101, but it may be configured to be controlled by a control unit of another apparatus (a camera, a smartphone, a tablet PC, or a laptop PC) (not shown) incorporating the power transmitting apparatus 100.

The memory 107 stores the states of the power transmitting apparatus 100 and the power receiving apparatus 200. The memory 107 also stores computer programs for operating the power transmitting apparatus 100. The authentication unit 108 executes a device authentication protocol with the power receiving apparatus 200 via the first communication unit 104 or the second communication unit 106.

Note that in the example shown in FIG. 1, the control unit 101, the power supply unit 102, the power transmitting unit 103, the first communication unit 104, the memory 107, and the second communication unit 106 are described as separated bodies, but some of them may be mounted in the same chip.

<Arrangement of Power Receiving Apparatus>

Figure 2:
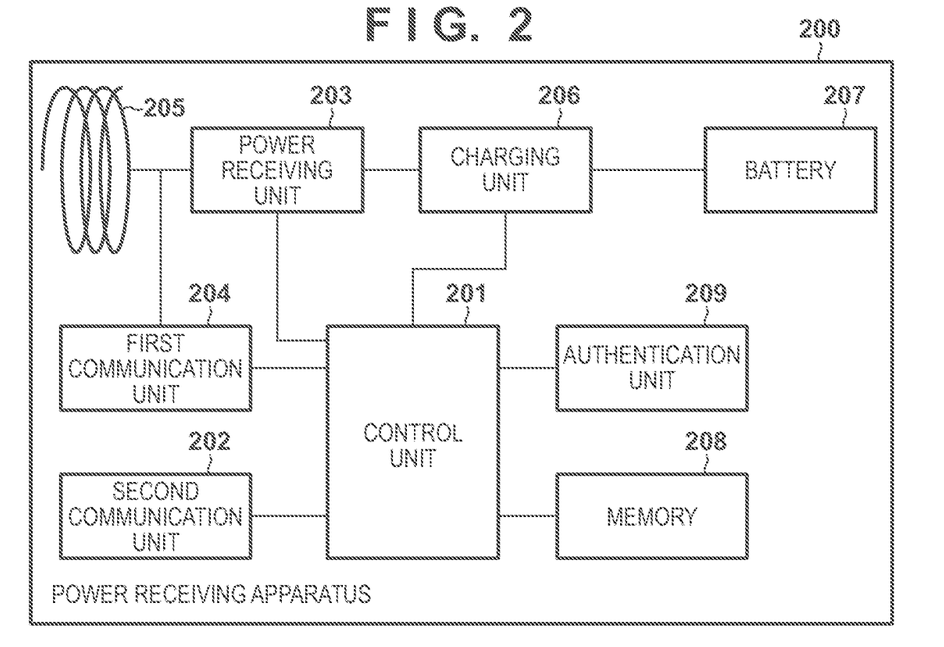
FIG. 2 is a block diagram showing an arrangement example of a power receiving apparatus according to the embodiment.

Next, FIG. 2 is a block diagram showing an arrangement example of a power receiving apparatus applicable to the wireless power transfer system according to the embodiment. The power receiving apparatus 200 complies with the WPC standard, includes a function described in the WPC standard v1.2.2, and supports the device authentication protocol.

The power receiving apparatus 200 includes a control unit 201, the second communication unit 202, a power receiving unit 203, the first communication unit 204, a power receiving coil 205, a charging unit 206, a battery 207, a memory 208, and an authentication unit 209.

The control unit 201 controls the overall power receiving apparatus 200. An example of the control unit 201 is a CPU. The power receiving unit 203 converts an AC voltage and an AC current from the power transmitting coil 105 received via the power receiving coil 205 into a DC voltage and a DC current used to operate the control unit 201, the charging unit 206, and the like. The power receiving unit 203 supplies power used by the charging unit 206 to charge the battery 207, and has a power supply capability of outputting a power of 15 W to the charging unit 206.

The first communication unit 204 performs control communication of wireless power transfer based on the WPC standard with the first communication unit 104 of the power transmitting apparatus 100. This control communication is communication performed by load-modulating the electromagnetic wave received by the power receiving coli 205.

The second communication unit 202 performs control communication of wireless power transfer based on the WPC standard with the second communication unit 106 of the power transmitting apparatus 100. The communication performed by the second communication unit 202 is communication using a frequency different from the frequency of the power transmitting unit 103 of the power transmitting apparatus 100, and uses an antenna (not shown) different from the power transmitting coil 105. In this embodiment, the second communication unit 202 is described to correspond to a Central of BLE. However, the second communication unit 202 may be a Peripheral of BLE, or may use Near Field Communication (NFC), Wi-Fi, or the like. In this embodiment, the second communication unit 202 can perform higher-speed communication than the communication performed by the first communication unit 204.

The second communication unit 202 is controlled by the control unit 201, but it may be configured to be controlled by a control unit of another apparatus (a camera, a smartphone, a tablet PC, or a laptop PC) (not shown) incorporating the power receiving apparatus 200.

The memory 208 stores the states of the power transmitting apparatus 100 and the power receiving apparatus 200. The memory 208 also stores computer programs for operating the power receiving apparatus 200. The authentication unit 209 executes the device authentication protocol with the power transmitting apparatus 100 via the first communication unit 204 or the second communication unit 202.

<Functions and State Transitions>

Figure 3:
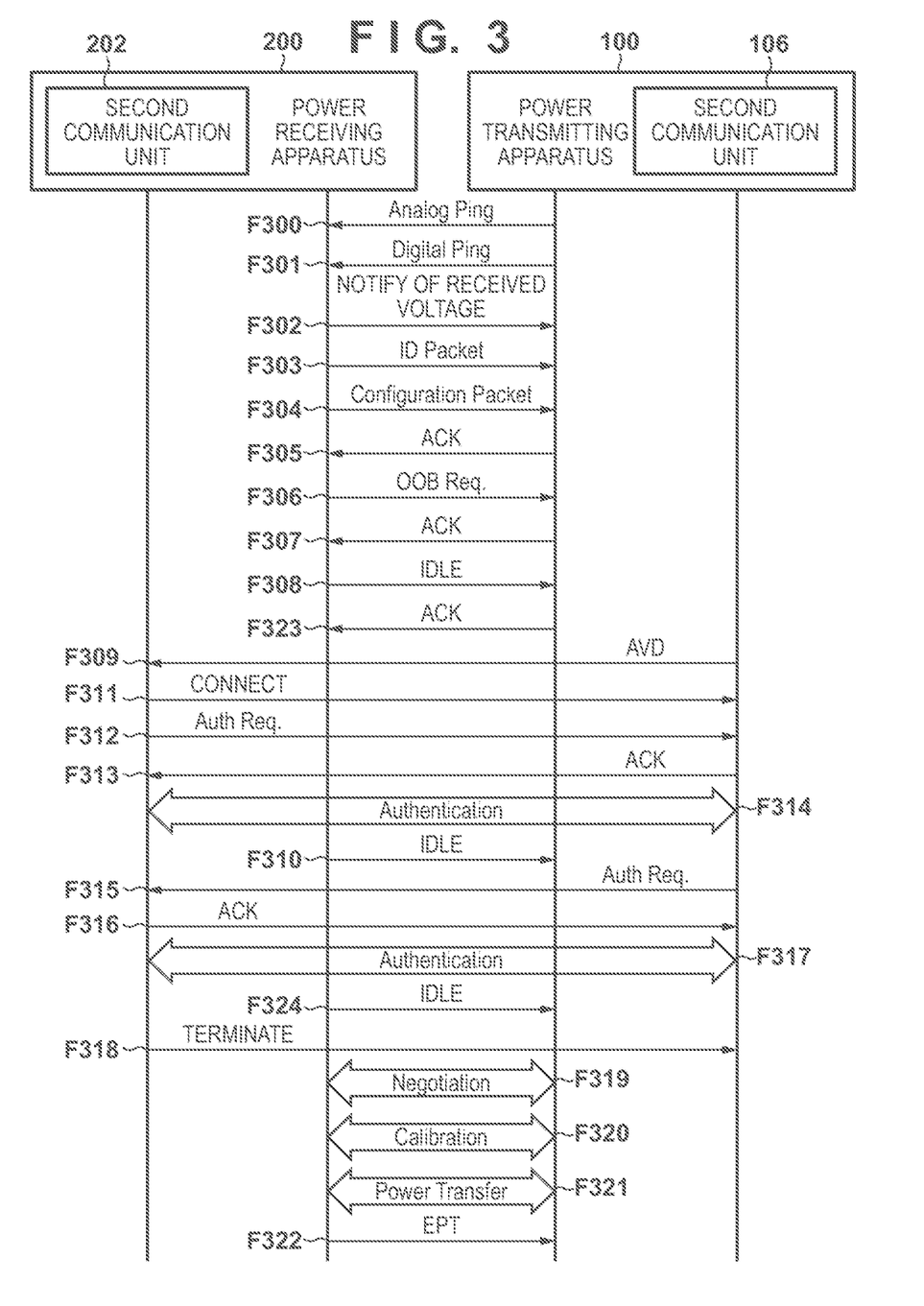
FIG. 3 is a sequence chart showing an operation of a wireless power transfer system according to the embodiment.

Here, the functions and state transitions of the power transmitting apparatus 100 and the power receiving apparatus 200 complying with the WPC standard will be schematically described by extracting corresponding portions from FIG. 3. FIG. 3 is a sequence chart of the power transmitting apparatus and the power receiving apparatus applicable to the wireless power transfer system according to the embodiment.

If the power transmitting apparatus 100 is activated, the power transmitting unit 103 transmits an Analog Ping via the power transmitting coil 105 (F300). The Analog Ping is a small-power signal used to detect an object existing near the power transmitting coil 105. While the power transmitting apparatus 100 is transmitting the Analog Ping, the power transmitting apparatus 100 is in a Selection phase.

The power transmitting apparatus 100 detects the voltage value or the current value of the power transmitting coil 105 upon transmitting the Analog Ping. If the voltage is smaller than a certain threshold value, the current value is larger than a certain threshold value, or the like, it is determined that an object exists near the power transmitting coil 105, and the power transmitting apparatus 100 transitions to a Ping phase.

In the Ping phase, the power transmitting apparatus 100 transmits a Digital Ping having a power larger than that of the Analog Ping (F301). The Digital Ping has a power whose magnitude is enough for activating the power receiving apparatus 200 and the control unit 201 existing near at least the power transmitting coil 105.

The control unit 201 of the power receiving apparatus 200 is activated by the power (Digital Ping) received via the power receiving coil 205. If the control unit 201 is activated, it notifies the power transmitting apparatus 100 of the magnitude of the received voltage (F302), and transitions to an Identification & Configuration (to be referred to as an I & C phase hereinafter). Here, the received voltage is notified by the first communication via the first communication unit 204.

If the received voltage notification is received from the power receiving apparatus 200, the power transmitting apparatus 100 transitions to the I & C phase. Then, the power receiving apparatus 200 transmits, to the power transmitting apparatus 100, an ID packet including a manufacturer code indicating the manufacturer of the self-apparatus and device identification information (F303). The power receiving apparatus 200 also transmits, to the power transmitting apparatus 100, a Configuration packet including the standard version which the self-apparatus complies with, and the like (F304).

The power transmitting apparatus 100 receives the Configuration packet from the power receiving apparatus 200, and determines whether the corresponding standard version of the power receiving apparatus 200 is a version equal to or higher than, for example, v1.2.2. If the standard version is a version equal to or higher than v1.2.2, the power transmitting apparatus 100 transmits, to the power receiving apparatus 200, an ACK indicating that the information included in the Configuration packet has been acknowledged (F305). Then, the power transmitting apparatus 100 transitions to a Negotiation phase (F319). Similarly, if the ACK is received (F305), the power receiving apparatus 200 transitions to the Negotiation phase (F319). Note that predetermined processing operations (F306 to F318, F323, and F324) specific to this embodiment will be described later.

In the Negotiation phase (F319), the power transmitting apparatus 100 and the power receiving apparatus 200 perform negotiation to determine Guaranteed Power (to be referred to as "GP" hereinafter) indicating the magnitude of power that the power receiving apparatus 200 can surely receive. More specifically, the power receiving apparatus 200 notifies the power transmitting apparatus 100 of a value serving as a GP candidate. The power transmitting apparatus 100 accepts or rejects the notification. Since the power receiving apparatus 200 has the power supply capability of outputting a power of 15 W to the charging unit 206, it can notify 15 W at maximum as a candidate of the GP value. The power transmitting apparatus 100 can accept 15 W at maximum as the GP value.

If the negotiation of the GP is terminated, the power transmitting apparatus 100 and the power receiving apparatus 200 transition to a Calibration phase (F320). Although details will not be described, but in the Calibration phase (F320), a parameter is determined, which is required for a foreign object detection function in which the power transmitting apparatus 100 detects whether an object different from the power receiving apparatus 200 exists near the power transmitting coil 105. In the Calibration phase, the power receiving apparatus 200 also performs processing of supplying power from the power receiving unit 203 to the charging unit 206 serving as a load. Thereafter, the power transmitting apparatus 100 and the power receiving apparatus 200 transition to a Power Transfer phase (F321), and the power receiving apparatus 200 charges the battery 207.

The above is a schematic description of the functions and state transitions of the power transmitting apparatus 100 and the power receiving apparatus 200 complying with the WPC standard.

<Device Authentication>

Next, device authentication will be described. The device authentication is processing of confirming mutual validity between the power transmitting apparatus 100 and the power receiving apparatus 200, and processing which is performed bidirectionally. More specifically, the power transmitting apparatus 100 may confirm the validity of the power receiving apparatus 200, or the power receiving apparatus 200 may confirm the validity of the power transmitting apparatus 100. The magnitude of power to be transmitted/received is determined in accordance with the result of the device authentication.

More specifically, for the power receiving apparatus whose validity cannot be confirmed, the power transmitting apparatus 100 transmits the power smaller than the power to be transmitted to the power receiving apparatus 200 whose validity could be confirmed. Accordingly, in the Negotiation phase, for the power receiving apparatus whose validity could not be confirmed, the power transmitting apparatus 100 accepts only a GP smaller than that for the power receiving apparatus whose validity could be confirmed, and does not accept 15 W, which is the maximum value of the GP that the self-apparatus can supply. The power receiving apparatus whose validity could not be confirmed may be an inferior power receiving apparatus, so that it may generate excessive heat compared to the valid power receiving apparatus. With the configuration as described above, it is possible to prevent excessive heat generation.

Similarly, for the power transmitting apparatus whose validity could not be confirmed, the power receiving apparatus 200 requests the GP smaller than the power to be received from the power transmitting apparatus whose validity could be confirmed. That is, in the Negotiation phase, the power receiving apparatus 200 does not request 15 W, which is the maximum value of the GP of the self-apparatus, from the power transmitting apparatus whose validity could not be confirmed. The power transmitting apparatus whose validity could not be confirmed may be an inferior power transmitting apparatus, so that it may generate excessive heat compared to the valid power transmitting apparatus. With the configuration as described above, it is possible to prevent excessive heat generation.

The device authentication is performed before the Negotiation phase. The reason for this is that the result of the device authentication influences the magnitude of the GP which is negotiated in the Negotiation phase. If the device authentication is performed after the GP has been determined in the Negotiation phase, unnecessary processing such as transitioning to the Negotiation phase again based on the result of the device authentication and renegotiating the GP may occur.

In order to terminate the device authentication processing earlier, a method of performing the device authentication by the second communication faster than the first communication is used.

Here, the phenomenon of a case in which the device authentication has been performed by the second communication will be described. First, according to the WPC standard, there is a mechanism of stopping power transmission if the power transmitting apparatus 100 cannot detect the power receiving apparatus 200. With this mechanism, when the power receiving apparatus 200 cannot be detected because the power receiving apparatus 200 has physically moved away from the power transmitting apparatus 100, the power transmitting apparatus 100 can stop the power transmission. Therefore, it is possible to prevent the power transmitting apparatus 100 from continuously emitting unnecessary radio waves even though the power receiving apparatus 200 does not exist in the power transmission range.

More specifically, in the I & C phase, after the end of a packet transmitted by the first communication unit 204 of the power receiving apparatus 200 is received by the power transmitting apparatus 100, if the beginning of a next packet is not received within a predetermined time (25 ms), the power transmitting apparatus 100 stops the power transmission. Further, in the Negotiation phase, after the power transmitting apparatus 100 transmits a response for the packet transmitted by the first communication unit 204 of the power receiving apparatus 200, if a next packet is not received within a predetermined time (250 ms), the power transmitting apparatus 100 stops the power transmission. Similarly in the Power Transfer phase, after the end of a packet transmitted by the first communication unit 204 of the power receiving apparatus 200 is received by the power transmitting apparatus 100, if the beginning of a next packet is not received within a predetermined time (1500 ms), the power transmitting apparatus 100 stops the power transmission. In this manner, the power transmitting apparatus 100 has a function of stopping power transmission due to a timeout.

After the I & C phase is terminated and the apparatuses transition to the Negotiation phase, if the device authentication (control communication) is performed by the second communication, for the reason described above, the negotiation of the GP is performed based on the result of the device authentication performed by the second communication. Therefore, there is no packet to be transmitted from the power receiving apparatus by the first communication. In this case, as has been described above, the power transmitting apparatus receives no packet from the power receiving apparatus by the first communication for a predetermined time so that it stops the power transmission. In addition, since retransmission is likely to occur in the second communication due to interference with another wireless communication, the first communication may not be performed for a longer time.

To the contrary, the power receiving apparatus according to this embodiment transmits a packet to the power transmitting apparatus by the first communication even during the device authentication performed with the power transmitting apparatus by the second communication. Therefore, it becomes possible to prevent the power transmitting apparatus from stopping the power transmission.

<Operation Sequence of Wireless Power Transfer System>

Using FIG. 3 again, the detailed procedure of the sequence of the wireless power transfer system including the power transmitting apparatus 100 and the power receiving apparatus 200 will be described. As has been described above, the power transmitting apparatus 100 transmits an Analog Ping (F300). If it is determined that an object exists near the power transmitting coil, the power transmitting apparatus 100 transmits the Digital Ping (F301). If the power receiving apparatus 200 receives a Digital Ping (F301), it activates the control unit 201. Then, the power receiving apparatus 200 notifies the power transmitting apparatus 100 of the received voltage of the Digital Ping (F302), and transitions to the I & C phase.

The power receiving apparatus 200 transmits an ID packet (F303), and transmits a Configuration packet to the power transmitting apparatus 100 via the first communication unit 104 (F304). If the Configuration packet is received, the power transmitting apparatus 100 transmits an ACK (F305). If the ACK is received (F305), the power receiving apparatus 200 transmits an OOB Req (F306).

Assume that, according to the Configuration packet, the power receiving apparatus 200 is determined to support the device authentication, and further support the device authentication using BLE. Assume that the power transmitting apparatus 100 also supports the device authentication, and further supports the device authentication using BLE. Therefore, the power transmitting apparatus 100 transmits an ACK indicating that it accepts to perform the device authentication using BLE (F307).

If the ACK is received (F307), the power receiving apparatus 200 starts to transmit an IDLE via the first communication unit 104 (F308). The power transmitting apparatus 100 transmits an ACK for the IDLE (F323). Here, if the power receiving apparatus 200 receives no ACK for the IDLE, the power receiving apparatus 200 may transmit, to the power transmitting apparatus 100, an EPT instructing to stop the power transmission. If the power receiving apparatus 200 receives a packet other than the ACK for the IDLE, for example, if an NAK or an ND (Not Defined) is received, the power receiving apparatus 200 may also transmit the EPT.

The ND packet is a response packet to be transmitted by the power transmitting apparatus 100 if the power transmitting apparatus 100 cannot understand the packet transmitted by the power receiving apparatus 200. If the power transmitting apparatus 100 has transmitted, to the power receiving apparatus 200, the AKC for the OOB Req received from the power receiving apparatus 200 (F307), the power transmitting apparatus 100 should be able to understand the intent of the IDLE which is transmitted to avoid power transmission stoppage due to a timeout. Nevertheless, if the power receiving apparatus 200 receives an NAK or an ND from the power transmitting apparatus 100 (F323), the power receiving apparatus 200 interprets that the power transmitting apparatus 100 has failed, and it can stop the power transmission by transmitting the EPT.

Then, the power transmitting apparatus 100 transmits an ADV via the second communication unit 106 (F309). The power receiving apparatus 200 transmits a CONNECT via the second communication unit 202 (F311). Thereafter, the power receiving apparatus 200 transmits an Auth Req (F312). After receiving an ACK from the power transmitting apparatus 100 (F313), the power receiving apparatus 200 performs Auth processing in which the self-apparatus operates as an initiator (F314).

Even while the power transmitting apparatus 100 and the power receiving apparatus 200 are performing control communication by the second communication, the power receiving apparatus 200 transmits an IDLE before a predetermined time elapses (for example, periodically) (F310 and F324). The power transmitting apparatus 100 responses to the IDLE with an ACK (not shown). Subsequently, the power transmitting apparatus 100 transmits an Auth Req (F315). After an ACK is received from the power receiving apparatus 200 (F316), the power transmitting apparatus 100 performs Auth processing in which the self-apparatus operates as an initiator (F317).

If the Auth processing is terminated, the power receiving apparatus 200 transmits an TERMINATE to the power transmitting apparatus 100 (F318), and terminates the BLE communication. Since the Auth processing is terminated, the power transmitting apparatus 100 and the power receiving apparatus 200 perform Negotiation of the GP (F319), transition to a Calibration phase (F320), and then transition to a PT phase (F321).

Here, it is defined by the WPC standard that, after the power receiving apparatus 200 transmits a packet, among Specific Request packets, whose Packet Type is Guaranteed Power and which notifies the power transmitting apparatus 100 of a desired GP, the power transmitting apparatus 100 and the power receiving apparatus 200 transmit/receive a packet at a predetermined timing. Accordingly, thereafter, the power transmitting apparatus 100 does not stop the power transmission due to a timeout. Therefore, the power receiving apparatus 200 stops transmitting the IDLE which is intended to prevent occurrence of a timeout.

As has been described above, while the control communication is performed by the second communication, the power receiving apparatus transmits the IDLE by the first communication to prevent the power transmitting apparatus from stopping the power transmission. Further, after the negotiation of the GP in which the packet to be transmitted by the first communication exists, transmission of the IDLE is stopped. This can stop transmission of a useless packet and reduce the processing.

Note that while the power transmitting apparatus 100 is performing the second communication, a situation may occur in which the second communication unit 106 cannot be used. For example, an apparatus (not shown) incorporating the power transmitting apparatus 100 may occupy the second communication unit 106. In this case, the power transmitting apparatus 100 may be configured to respond to the IDLE with an NAK if it is determined that the second communication unit 106 cannot be used for the second communication.

If the NAK is received, the power receiving apparatus 200 switches the control communication performed by the second communication to the control communication by the first communication. More specifically, after the NAK is received, if no TERMINATE is received, the power receiving apparatus 200 transmits the TERMINATE. Then, the control communication, which has been performed by the second communication, is performed by the first communication. Of course, at the time of switching to the first communication, there is a packet to be transmitted by the first communication. Therefore, it is unnecessary to transmit the IDLE, so that the power receiving apparatus 200 stops transmitting the IDLE. Thus, even in a case in which the second communication cannot be used, the communication with the power transmitting apparatus 100 can be continued.

The power for operating the second communication unit 202 of the power receiving apparatus 200 is supplied by a battery (not shown) of the power receiving apparatus 200. If the battery level is insufficient for driving BLE, the power receiving apparatus 200 may store "0" in the BLE bit of the Configuration packet. Also in a case in which the apparatus (not shown) incorporating the power receiving apparatus 200 is using BLE so BLE cannot be used for the authentication processing (control communication), the power receiving apparatus 200 may store "0" in the BLE bit of the Configuration packet. With this configuration, it is possible to avoid occurrence of a problem that the power transmitting apparatus 100 transmits the ADV even though the power receiving apparatus 200 cannot use BLE for the second communication.

<Processing of Power Receiving Apparatus>

Next, with reference to flowcharts of FIGS. 4A and 4B, a procedure of processing performed by the power receiving apparatus 200 according to this embodiment will be described. First, in step S401, the power receiving apparatus 200 performs the processing in the Selection phase and the processing in the Ping phase described with reference to FIG. 3.

In step S402, the power receiving apparatus 200 transmits an ID packet and a Configuration packet to the power transmitting apparatus 100. Here, in the Configuration packet, the power receiving apparatus 200 notifies the power transmitting apparatus 100 that it supports the device authentication and it can perform the device authentication by the second communication using BLE. More specifically, by using a Reserve region not used in the Configuration packet of the WPC standard, the Configuration packet with "1" in the Authentication bit (to be referred to as the Auth bit hereinafter) and "1" in the BLE bit is transmitted to the power transmitting apparatus 100. The Auth bit is a bit used to indicate that the power receiving apparatus 200 supports the device authentication. The BLE bit is a bit used to indicate that the device authentication can be performed by the second communication using BLE.

In step S403, the power receiving apparatus 200 determines whether an ACK to the Configuration packet is received from the power transmitting apparatus. According to the WPC standard v1.2.2, if an ACK to the Configuration packet is received, the power receiving apparatus 200 can recognize that the power transmitting apparatus corresponds to the Negotiation phase. If the ACK is received, the power receiving apparatus 200 transitions to the Negotiation phase, and advances to step S404. On the other hand, if no ACK is received, the process advances to step S418.

In step S404, the power receiving apparatus 200 transmits, via the second communication unit 202, an Out OFB and Request (OOB Req) packet indicating a request for the second communication using BLE. The OOB Req packet is transmitted to confirm that the power transmitting apparatus 100 supports BLE as the second communication unit 106 and further supports the device authentication using the second communication unit 106.

The OOB Req packet includes a BLE bit. If "1" is set in the BLE bit, it indicates a request for using BLE as the second communication. The OOB Req packet also includes an Auth bit. If "1" is set in the Auth bit, it indicates a request for the device authentication using the second communication.

The OOB Req packet may include an NFC bit which indicates a request for using NFC as the kind of the second communication. If "1" is set in the NFC bit, it indicates a request for using NFC as the second communication. Similarly, the OOB Req packet may include a Wi-Fi bit which indicates a request for using Wi-Fi as the kind of the second communication. Further, among General Request packets or Specific Request packets defined by the WPC standard, a Reserved packet or a Proprietary packet whose Packet type is undefined may be defined as the OOB Req packet.

In step S405, the power receiving apparatus 200 determines whether an ACK is received from the power transmitting apparatus 100 as a response to the OOB Req. If the power receiving apparatus 200 receives the ACK from the power transmitting apparatus 100 as a response to the OOB Req, the power receiving apparatus 200 can recognize that the power transmitting apparatus 100 supports BLE as the second communication unit 106 and further supports the device authentication using the second communication unit 106. If the ACK is received, the process advances to step S406. On the other hand, if no ACK is received, the process advances to step S420.

In step S406, during a period from the transition to the Negotiation phase to the negotiation of the GP, the power receiving apparatus 200 periodically transmits the IDLE to the power transmitting apparatus 100 via the first communication unit 204 at a timing defined by the WPC standard. The IDLE corresponds to, for example, each of F308, F310, and F324 in FIG. 3. More specifically, the power receiving apparatus 200 transmits a next IDLE within 19 ms at maximum, which is defined by the WPC standard, from the end of the response packet (for example, ACK) to the IDLE, that is, the end of the preceding packet, which is transmitted by the power transmitting apparatus 100 via the first communication unit 104. Here, the IDLE packet is a packet that is periodically transmitted to prevent the power transmitting apparatus 100 from stopping the power transmission during the control communication performed by the second communication.

If the IDLE is received, the power transmitting apparatus 100 that can understand the OOB Req may transmit an ACK as a response. Since the power transmitting apparatus 100 periodically receives the IDLE, it does not stop the power transmission due to a timeout. Therefore, in a case in which the device authentication is performed by the second communication, it is possible to prevent the power transmitting apparatus from stopping the power transmission since it receives no packet by the first communication for a predetermined time.

Note that since the purpose of the IDLE transmitted by the power receiving apparatus 200 is to prevent the power transmitting apparatus 100 from determining that a timeout has occurred, another packet may be used. For example, among General Request packets or Specific Request packets, a Reserved packet or a Proprietary packet whose Packet type is undefined may be used.

Then, in step S407, the power receiving apparatus 200 determines whether an Advertise Indication packet (to be referred to as an ADV hereinafter) is received from the second communication unit 106 of the power transmitting apparatus 100 within a predetermined time after the ACK is received in step S405. Here, the ADV is information transmitted by a Peripheral of BLE. The ADV stores the Bluetooth Device Address (to be referred to as the BD address hereinafter) which is the device identification information of the Peripheral, and supported profile information (service information). If an ADV is received within the predetermined time, the process advances to step S408. On the other hand, if no ADV is received within the predetermined time, the process advances to step S421.

Note that in order to determine whether the ADV received by the power receiving apparatus 200 is the ADV transmitted by the power transmitting apparatus 100, the power receiving apparatus 200 may receive the BD address of the second communication unit 106 of the power transmitting apparatus 100 in advance. More specifically, after the ACK is received in step S405, the power receiving apparatus 200 transmits a packet, which is defined by the WPC standard as a packet for inquiring about the capability, to the power transmitting apparatus 100 via the first communication unit 204. Then, the power transmitting apparatus 100 may transmit, as a response to the packet, a response storing the BD address to the power receiving apparatus 200 via the first communication unit 104. Alternatively, a packet for inquiring the BD address may be newly assigned. For example, among General Request packets or Specific Request packets, a Reserved packet or a Proprietary packet whose Packet type is undefined may be assigned.

By receiving the BD address of the power transmitting apparatus 100 and determining whether it matches the BD address received via the second communication unit 202, the power receiving apparatus 200 can determine whether the ADV is received from the power transmitting apparatus 100.

In step S408, the power receiving apparatus 200 transmits a CONNECT packet indicating that a connection with the power transmitting apparatus 100 is performed by BLE via the second communication unit 202.

In step S409, after data transmission/reception with the power transmitting apparatus 100 by BLE is enabled, the power receiving apparatus 200 transmits an Auth Req packet to the power transmitting apparatus 100 via the second communication unit 202. The Auth Req packet is a packet used to indicate that the device authentication for confirming the validity of the power transmitting apparatus 100 is requested.

The Auth Req packet includes information requesting that the transmission source (power receiving apparatus 200) of the packet operates as an initiator having a role of confirming the validity of the transmission destination (power transmitting apparatus 100) and the transmission destination operates as a responder having a role of having its validity confirmed.

In step S410, the power receiving apparatus 200 determines whether an ACK indicating the acceptance of the Auth Req is received from the power transmitting apparatus 100. If an ACK indicating the acceptance is received, the process advances to step S411. On the other hand, if no ACK indicating the acceptance is received, the process advances to step S412.

In step S411, the power receiving apparatus 200 performs Authentication which is a device authentication protocol. The Authentication processing (to be referred to as the Auth processing hereinafter) is one of authentication protocols using digital certificates. In the Auth processing, the power receiving apparatus 200 confirms the validity of the power transmitting apparatus 100.

If the validity of the power transmitting apparatus 100 is confirmed in step S411 or if no ACK is received in step S410, in step S412, the power receiving apparatus 200 determines if an Auth Req is received from the power transmitting apparatus 100 via the second communication unit 202 within a predetermined time. The Auth Req includes information indicating that the power transmitting apparatus 100 operates as an initiator having a role of confirming the validity of the transmission destination (power receiving apparatus 200) and the power receiving apparatus 200 as the transmission destination operates as a responder having a role of having its validity confirmed. If an Auth Req is received, the process advances to step S413. On the other hand, if no Auth Req is received, the process advances to step S414.

In step S413, the power receiving apparatus 200 performs Authentication in which the self-apparatus operates as the responder. Here, if the power receiving apparatus 200 cannot confirm the validity of the power transmitting apparatus 100 in the Auth processing in step S411, that is, if the device authentication is failed, it is unpreferable to perform the Auth processing in which the power transmitting apparatus 100 operates as the initiator. In this case, the BLE connection may be disconnected without waiting for the Auth Req transmitted by the power transmitting apparatus 100. The reason for this is that since the validity of the power transmitting apparatus 100 cannot be confirmed, regardless of the result of the Auth processing in which the power transmitting apparatus 100 operates as the initiator, it is necessary to limit the GP requested to the power transmitting apparatus 100 in the Negotiation phase to be described later. By avoiding useless Auth processing, the speed of processing up to the start of power transmission can be increased. Note that the power receiving apparatus 200 may be configured to store, in the memory, the identification information, for example, the BD address or the identification information defined by the WPC standard, of the power transmitting apparatus whose validity could not be confirmed so as not to perform a BLE connection with this power transmitting apparatus thereafter.

In step S414, the power receiving apparatus 200 transmits a TERMINATE Indication (to be referred to as a TERMINATE hereinafter), which means that the BLE connection is disconnected, to the power transmitting apparatus 100 via the second communication unit 202.

In step S415, the power receiving apparatus 200 determines that, after the BLE is disconnected, it uses not the second communication unit 202 but uses the first communication unit 204, and stops transmitting the IDLE. In this manner, by transmitting the IDLE packet to the power transmitting apparatus 100 via the first communication unit 204 while the second communication unit 202 is used, it is possible to prevent the power transmitting apparatus 100 from stopping the power transmission.

Further, by transmitting the IDLE and not performing negotiation of the GP during the device authentication, it is possible to prevent that the negotiation of the GP is performed by the first communication while the device authentication is performed via BLE so that renegotiation of the GP is required after the device authentication is terminated. In a case in which BLE is disconnected and no control communication using the second communication is performed, the transmission of the IDLE is stopped. With this configuration, a useless packet is not transmitted, and the processing of the control unit can be reduced.

In step S416, the power receiving apparatus 200 performs negotiation of the GP with the power transmitting apparatus 100. Here, if the validity of the power transmitting apparatus 100 has been confirmed, the power receiving apparatus 200 requests, as the GP, a maximum value of 15 W via the second communication unit 202. In this case, since the power transmitting apparatus 100 has also confirmed the validity of the power receiving apparatus 200, the power transmitting apparatus 100 accepts the request from the power receiving apparatus 200 within a range that does not exceed 15 W, which is the maximum value of the GP of the power transmitting apparatus 100.

Subsequently, in step S417, the power receiving apparatus 200 transitions to the Calibration phase. In step S418, the power receiving apparatus 200 transitions to the PT phase and supplies, to the charging unit 206, a power of 15 W at maximum using the power received from the power transmitting apparatus 100. If the charging is terminated, in step S419, the power receiving apparatus 200 transmits an End Power Transfer (EPT) instructing to stop the power transmission to the power transmitting apparatus 100 via the first communication unit 204.

In step S420, the power receiving apparatus 200 determines whether an NAK serving as a reject response is received. If an NAK is received, the process advances to step S423. On the other hand, if no NAK is received, the process advances to step S418, and the power receiving apparatus 200 transitions to the PT phase and starts charging while setting the received power to 5 W at maximum.

In step S421, the power receiving apparatus 200 determines to perform the Authentication using not the second communication but the first communication. In step S422, the power receiving apparatus 200 stops transmitting the IDLE. In step S423, the power receiving apparatus 200 performs the Authentication by the first communication via the first communication unit 204. Thereafter, the power receiving apparatus 200 advances to step S416 and performs negotiation of the GP.

According to the series of processing described above, the power transmitting apparatus and the power receiving apparatus can suitably control the first communication and the second communication.

As has been described above, the time of receiving the ADV in step S407 is limited to be within a predetermined time after the ACK is received in step S405. With this configuration, in a case in which BLE of the power transmitting apparatus 100 or the power receiving apparatus 200 is not operating normally, the ADV cannot be received due to the poor radio wave environment, or the like, it is possible to perform the device authentication by the first communication. Further, if it is determined in step S421 that the device authentication is performed by the first communication, the transmission of the IDLE is stopped in step S422. This can prevent transmission of a useless packet.

Note that the example has been described in which, if no ADV is received within the predetermined time, the power receiving apparatus 200 performs the Authentication by the first communication in step S423, but the present disclosure is not limited to this example. The similar effect can be obtained with a configuration in which, if communication using BLE is not started or a connection by BLE cannot be established within a predetermine time, the Authentication is performed by the first communication.

Further, the example has been described in which the power receiving apparatus 200 transmits the OOB Req to confirm that the power transmitting apparatus 100 supports BLE as the second communication unit 106 and further supports the device authentication using the second communication unit 106.

However, the present disclosure is not limited to this, and the capability of the power transmitting apparatus 100 may be inquired before transmitting the OOB Req. More specifically, the power receiving apparatus 200 transmits, via the first communication unit 204, a General Request (Power Transmitter Capability) (a description indicating the Packet type is parenthesized) prior to the OOB Req. The General Request (Power Transmitter Capability) is defined as a packet, among General Request packets defined by the WPC standard, used to inquire the capability of the power transmitting apparatus. Then, the power transmitting apparatus 100 may transmit a Power Transmitter Capability packet to the power receiving apparatus 200 via the first communication unit 104. The Power Transmitter Capability packet is a packet including a BLE bit, an Auth bit, and an Enable bit. The BLE bit is a bit used to indicate that BLE is supported as the second communication. The Auth bit is a bit used to indicate that the device authentication processing using BLE is supported. The Enable bit is a bit used to indicate whether the authentication processing using BLE can be performed currently.

The power receiving apparatus 200 is configured to transmit the OOB Req if the BLE bit is "1", the Auth bit is "1", and the Enable bit is "1". Otherwise (if the second communication unit 202 cannot perform the device authentication), the power receiving apparatus 200 is configured to transmit no OOB Req. With this configuration, it is possible to prevent transmission of a useless OOB Req.

Note that in a case in which the power transmitting apparatus 100 or the apparatus (not shown) incorporating the power transmitting apparatus 100 is using BLE so BLE cannot be used for the authentication processing (control communication), the power transmitting apparatus 100 stores "0" in the Enable bit. Also in a case in which the battery (not shown) supplies the power for operating BLE and the battery level is insufficient for operating BLE, the power transmitting apparatus 100 stores "0" in the Enable bit.

The power transmitting apparatus 100 may include a third communication unit (for example, NFC) (not shown) that functions as a second communication unit different from the second communication unit 106. In this case, a bit used to indicate that the third communication unit is supported, a bit used to indicate that the device authentication using the third communication unit is supported, and an Enable bit used to indicate whether the authentication processing using the third communication unit can be performed currently may be further provided.

With this configuration, flexible control is possible if the power receiving apparatus 200 and the power transmitting apparatus 100 support a plurality of second communications. For example, consider a case in which the power transmitting apparatus 100 and the power receiving apparatus 200 support BLE and NFC as the second communications. If the power transmitting apparatus 100 cannot perform the device authentication using BLE (the Auth bit or the Enable bit is "0") but can perform the device authentication using NFC (both the Auth bit and the Enable bit are "1"), the device authentication using NFC can be performed. In this case, the power receiving apparatus 200 transmits an OOB Req in which the NFC bit is "1" and the Auth bit is "1".

<Processing of Power Transmitting Apparatus>

Next, with reference to flowcharts of FIGS. 5A and 5B, a procedure of processing performed by the power transmitting apparatus 100 according to this embodiment will be described.

In step S501, the power transmitting apparatus 100 performs the processing in the Selection phase and the processing in the Ping phase. In step S502, the power transmitting apparatus 100 receives an ID packet and a Configuration packet from the power receiving apparatus 200. By receiving the Configuration packet, the power transmitting apparatus 100 can recognize that the power receiving apparatus 200 supports the device authentication and the power receiving apparatus 200 can perform the device authentication by the second communication using BLE.

In step S503, the power transmitting apparatus 100 transmits an ACK via the first communication unit 104. In step S504, the power transmitting apparatus 100 determines whether an OOB Req transmitted from the power receiving apparatus 200 is received. If an OOB Req is received, the process advances to step S505. On the other hand, if no OOB Req is received, the process advances to step S522.

In step S505, the power transmitting apparatus 100 determines whether the self-apparatus can currently use BLE for the device authentication. If BLE can be used, the process advances to step S506. On the other hand, if BLE cannot be used, the process advances to step S521.

In step S506, the power transmitting apparatus 100 transmits, to the power receiving apparatus 200, an ACK as a response to the OOB Req. After transmitting the ACK, in step S507, the power transmitting apparatus 100 transmits an ADV via the second communication unit 106 within a predetermined time. In step S508, the power transmitting apparatus 100 determines whether a CONNECT is received from the power receiving apparatus 200. If a CONNECT is received, the process advances to step S509. On the other hand, if no CONNECT is received, the process advances to step S522.

Then, in step S509, the power transmitting apparatus 100 determines whether an Auth Req packet requesting that the power receiving apparatus 200 operates as an initiator is received from the power receiving apparatus 200. If an Auth Req packet is received, the process advances to step S510. On the other hand, if no Auth Req packet is received, the process advances to step S512.

In step S510, the power transmitting apparatus 100 transmits the ACK in response to the reception of the Auth Req packet. In step S511, the power transmitting apparatus 100 performs Auth processing in which the self-apparatus operates as a responder. After the Auth processing is terminated, in step S512, the power transmitting apparatus 100 transmits, to the power receiving apparatus 200, an Auth Req requesting Auth processing in which the self-apparatus operates as an initiator. If the CONNECT is received and the communication using BLE is enabled (YES in step S508) but the Auth Req requesting that the power transmitting apparatus 100 operates as the responder is not received within a predetermined time (NO in step S509), the process also advances to step S512. Also in this case, in step S512, the power transmitting apparatus 100 transmits, to the power receiving apparatus 200, an Auth Req requesting Auth processing in which the self-apparatus operates as an initiator.

In step S513, the power transmitting apparatus 100 determines whether an ACK to the Auth Req transmitted in step S512 is received from the power receiving apparatus 200. If the ACK is received, the process advances to step S514. On the other hand, if no ACK is received, the process advances to step S515.

In step S514, the power transmitting apparatus 100 performs the Auth processing in which the self-apparatus operates as the initiator. In step S515, the power transmitting apparatus 100 determines whether a TERMINATE is received from the power receiving apparatus 200. If the TERMINATE is received, the process advances to step S517. On the other hand, if no TERMINATE is received, the process advances to step S516. In step S516, the power transmitting apparatus 100 transmits a TERMINATE to the power receiving apparatus 200, and terminates the communication via the second communication unit 106.

In step S517, the power transmitting apparatus 100 negotiates the GP with the power receiving apparatus 200 in the Negotiation phase. Here, if the validity of the power transmitting apparatus 100 has been confirmed, the power receiving apparatus 200 requests, as the GP, a maximum value of 15 W. In this case, since the power transmitting apparatus 100 has also confirmed the validity of the power receiving apparatus 200, the power transmitting apparatus 100 accepts the request from the power receiving apparatus 200 within a range that does not exceed 15 W, which is the maximum value of the GP of the power transmitting apparatus 100.

Subsequently, in step S518, the power transmitting apparatus 100 transitions to the Calibration phase. In step S519, the power transmitting apparatus 100 transitions to the PT phase, and supplies a power of 15 W at maximum to the charging unit 206 of the power receiving apparatus 200.

If the charging is terminated, in step S520, the power transmitting apparatus 100 receives an EPT instructing to stop the power transmission, which is transmitted via the first communication unit 204 of the power receiving apparatus 200.

At the time of receiving the OOB Req in step S504, if BLE cannot be used (NO in step S505), the power transmitting apparatus 100 transmits an NAK to the power receiving apparatus 200 in S521. Then, the process advances to step S522.

In step S522, the power transmitting apparatus 100 determines to perform the Auth processing using not the second communication but the first communication. Then, in step S523, the Auth processing is performed by the first communication. Thereafter, the process advances to step S517.

Note that if the power transmitting apparatus 100 cannot confirm the validity of the power receiving apparatus 200 in step S511, that is, if the device authentication is failed, the power transmitting apparatus 100 may transmit no Auth Req and disconnect the BLE connection. This is performed so as not to perform the Auth processing in which the power transmitting apparatus 100 operates as the initiator.

The reason for this is that since the validity of the power receiving apparatus 200 cannot be confirmed, regardless of the result of the Auth processing in which the power transmitting apparatus 100 operates as the initiator, it is necessary for the power transmitting apparatus 100 to limit the GP requested by the power receiving apparatus 200. In this manner, by avoiding useless Auth processing, the speed of processing up to the start of power transmission can be increased.

<Processing of Power Transmitting Apparatus>

Next, with reference to a flowchart of FIG. 6, a case will be described in which the power transmitting apparatus 100 according to this embodiment does not stop the power transmission even though the device authentication has been performed by the second communication.

In step S601, the power transmitting apparatus 100 transmits, via the first communication unit 104, the ACK to the OOB Req transmitted from the power receiving apparatus 200. In response to this, by receiving the ACK, the power receiving apparatus 200 starts to periodically transmit the IDLE (step S406), and connects with the second communication unit 106 of the power transmitting apparatus 100 using BLE (step S408).

In step S602, the power transmitting apparatus 100 determines whether the IDLE transmitted from the power receiving apparatus 200 is received via the first communication unit 104. If the IDLE is received, the process advances to step S603. On the other hand, if no IDLE is received, the process advances to step S605.

In step S603, the power transmitting apparatus 100 extends, for a predetermined period (for example, 200 ms), the transmission of the Digital Ping which is currently performed. In step S604, the power transmitting apparatus 100 determines whether the TERMINATE is received from the second communication unit 202 of the power receiving apparatus 200. If the TERMINATE is received, the processing is terminated. On the other hand, if no TERMINATE is performed, the process returns to step S602.

Note that if the Auth processing is being performed between the second communication unit 106 of the power transmitting apparatus 100 and the second communication unit 202 of the power receiving apparatus 200, the power transmitting apparatus 100 receives no TERMINATE from the second communication unit 202 of the power receiving apparatus 200. Accordingly, the process returns to step S602. Then, the power transmitting apparatus 100 determines whether the IDLE is received again.

In step S605, the power transmitting apparatus 100 determines whether a timeout has occurred. Here, the power transmitting apparatus 100 sets, as a timeout value, for example, a value equal to or larger than 200 ms which is the extended transmission period of the Digital Ping set in step S603. If a timeout has occurred, the process advances to step S606. On the other hand, if no timeout occurs, the process returns to step S602, and it is determined again whether the IDLE is received.

Here, the power receiving apparatus 200 may transmit a next IDLE within, for example, 19 ms at maximum from the end of the response packet (for example, ACK) to the IDLE. The processing from the start of transmission of the IDLE by the power receiving apparatus 200 via the transmission of the end of the ACK to the IDLE by the power transmitting apparatus 100 until the start of transmission of the next IDLE by the power receiving apparatus 200 is considered as one cycle, and the time of one cycle is set to, for example, 50 ms. Then, the power transmitting apparatus 100 can always receive the IDLE within 200 ms, which is the extended transmission period of the Digital Ping, so that the power transmitting apparatus 100 can extend the transmission period of the Digital Ping again.

Every time the IDLE is received, the power transmitting apparatus 100 resets the timer value to the initial value. With this operation, even while the power receiving apparatus 200 is performing the device authentication with the power transmitting apparatus 100 by the second communication, the power receiving apparatus 200 can transmit the packet to the power transmitting apparatus 100 by the first communication. Therefore, the power transmitting apparatus 100 can continue to transmit the Digital Ping without the timeout. Further, the power transmitting apparatus 100 can perform higher-speed control communication using the second communication unit 106 while continuing control communication using the first communication unit 104.

If it becomes impossible for the power transmitting apparatus 100 to receive the IDLE packet since the power receiving apparatus 200 has moved outside the power transmittable range of the power transmitting apparatus 100, or the like, a timeout occurs (YES in step S605). Therefore, in step S606, the power transmitting apparatus 100 stops transmitting the Digital Ping.

Then, in step S607, the power transmitting apparatus 100 transmits a TERMINATE to the power receiving apparatus 200 via the second communication unit 106. With this operation, in a case in which the control communication using the first communication unit 104 of the power transmitting apparatus 100 is disabled and the power transmission is stopped, the power transmitting apparatus 100 can also stop control using the second communication unit 106. Further, if the TERMINATE is received from the power receiving apparatus 200 (YES in step S604), the power transmitting apparatus 100 can disconnect BLE and terminate the processing.

<Modifications>

In the embodiment described above, the example has been described in which, in order to prevent occurrence of a timeout in the power transmitting apparatus 100, the power receiving apparatus 200 periodically transmits the IDLE packet by the first communication while the second communication is performed.

Figure 6:
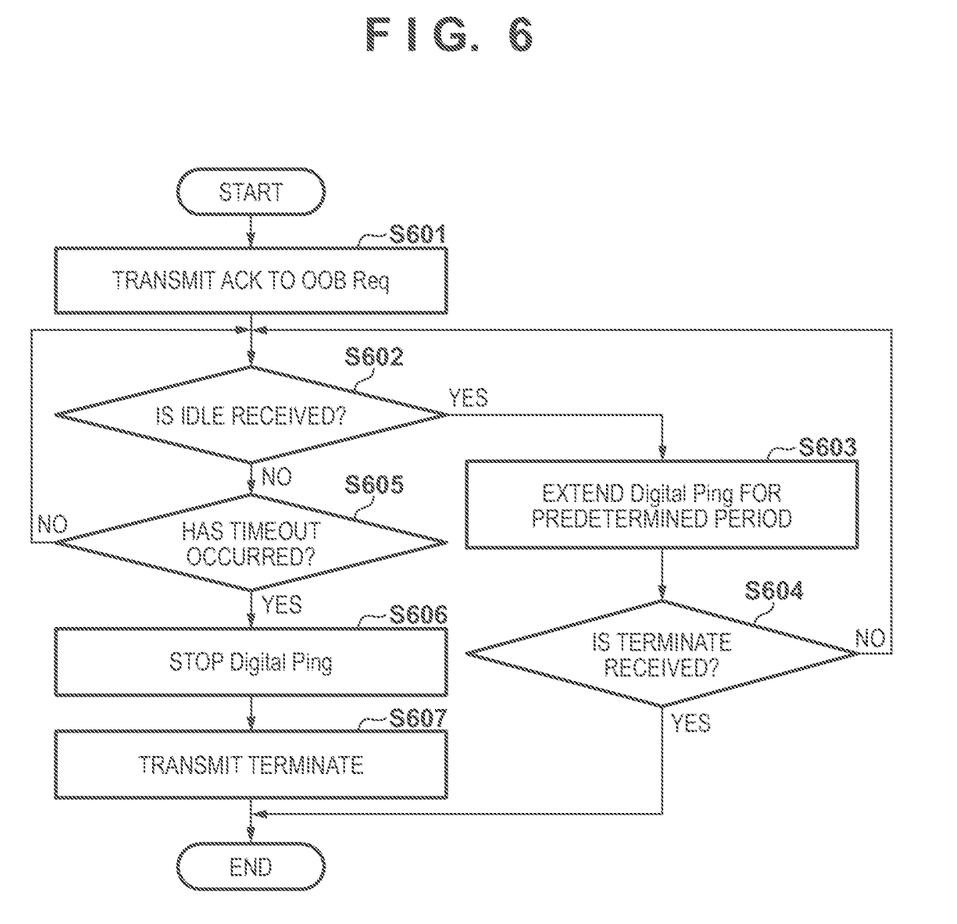
FIG. 6 is a flowchart illustrating a procedure of processing related to prevention of power transmission stoppage performed by the power transmitting apparatus according to the embodiment.

At this time, while the second communication is performed, the power transmitting apparatus 100 may set the timeout value shown in FIG. 6 to a larger value than in a case in which only the first communication is performed.

After transmitting the ACK (F307) to the OOB Req (F306) and determining that the second communication is performed, the power transmitting apparatus 100 sets the timeout value to a larger value than in a case in which only the first communication is performed (a case in which the second communication is not performed). Then, if the TERMINATE is received (F318) and it is determined that the second communication is not performed, the timeout value is reset to the original value. The larger value may be a value larger than, for example, 500 ms. Alternatively, the timeout value may be a sufficiently large value so that the period from the transmission of the ADV (F309) or the transmission of the ACK (F307) to the reception of the TERMINATE is included.

If the second communication is used, based on the timeout value set to the larger value, the power receiving apparatus 200 periodically transmits the IDLE in a longer cycle than in a case in which only the first communication is performed. With this configuration, the effect similar to that in the above-described embodiment can be obtained.

Further, if the second communication is used, the power transmitting apparatus 100 may determine, based on the packet received by the second communication, whether the timeout has occurred. If only the first communication is used, the power transmitting apparatus 100 determines the timeout based on the packet received via the first communication unit 104. On the other hand, after the ACK (F307) to the OOB Req (F306) is transmitted, the power transmitting apparatus 100 determines the timeout based on the packet received via the second communication unit 106. If the second communication is used, the timeout value may be changed.

In order to prevent occurrence of the timeout in the power transmitting apparatus 100, the power receiving apparatus 200 transmits the packet via the second communication unit 202. With this configuration, the effect similar to that in the above-described embodiment can be obtained.

Note that the power transfer method of the wireless power transfer system according to the present disclosure is not particularly limited. A magnetic field resonance method may be used in which power is transferred utilizing coupling by the magnetic field resonance (resonance) between a resonator (resonator element) of a power transmitting apparatus and a resonator (resonant element) of a power receiving apparatus. Alternatively, an electromagnetic induction method, an electric field resonance method, a microwave method, or a power transfer method using a laser or the like may be used.

Each of the power transmitting apparatus and the power receiving apparatus may be, for example, an image input apparatus such as an image capturing apparatus (a camera, a video camera, or the like) or a scanner, or may be an image output apparatus such as a printer, a copying machine, or a projector. Alternatively, each of the power transmitting apparatus and the power receiving apparatus may be a storage apparatus such as a hard disk apparatus or a memory apparatus, or may be an information processing apparatus such as a personal computer (PC) or a smartphone.

Figure 4A:
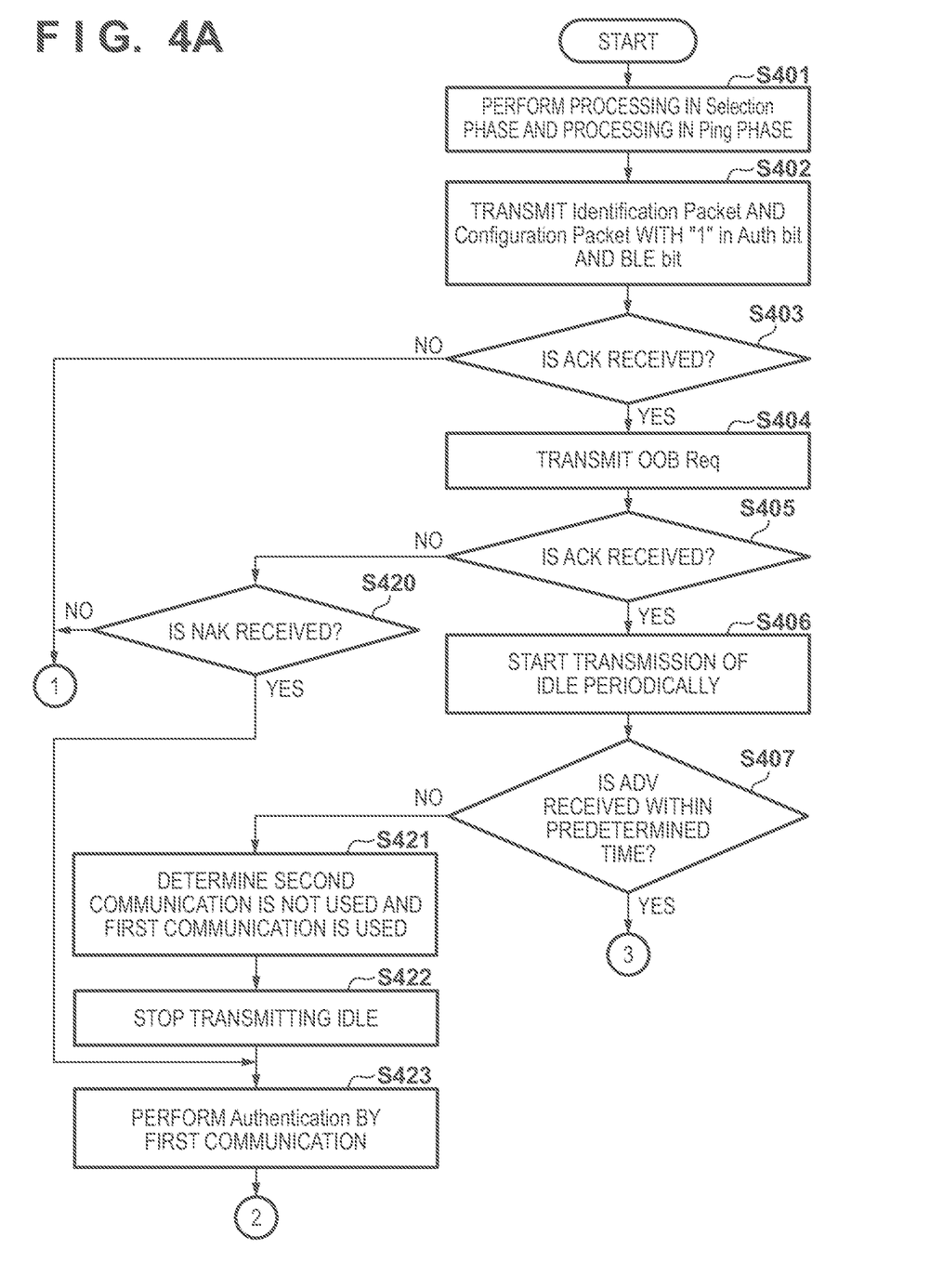
FIG. 4A is a flowchart illustrating a procedure of processing performed by the power receiving apparatus according to the embodiment.
Figure 4B:
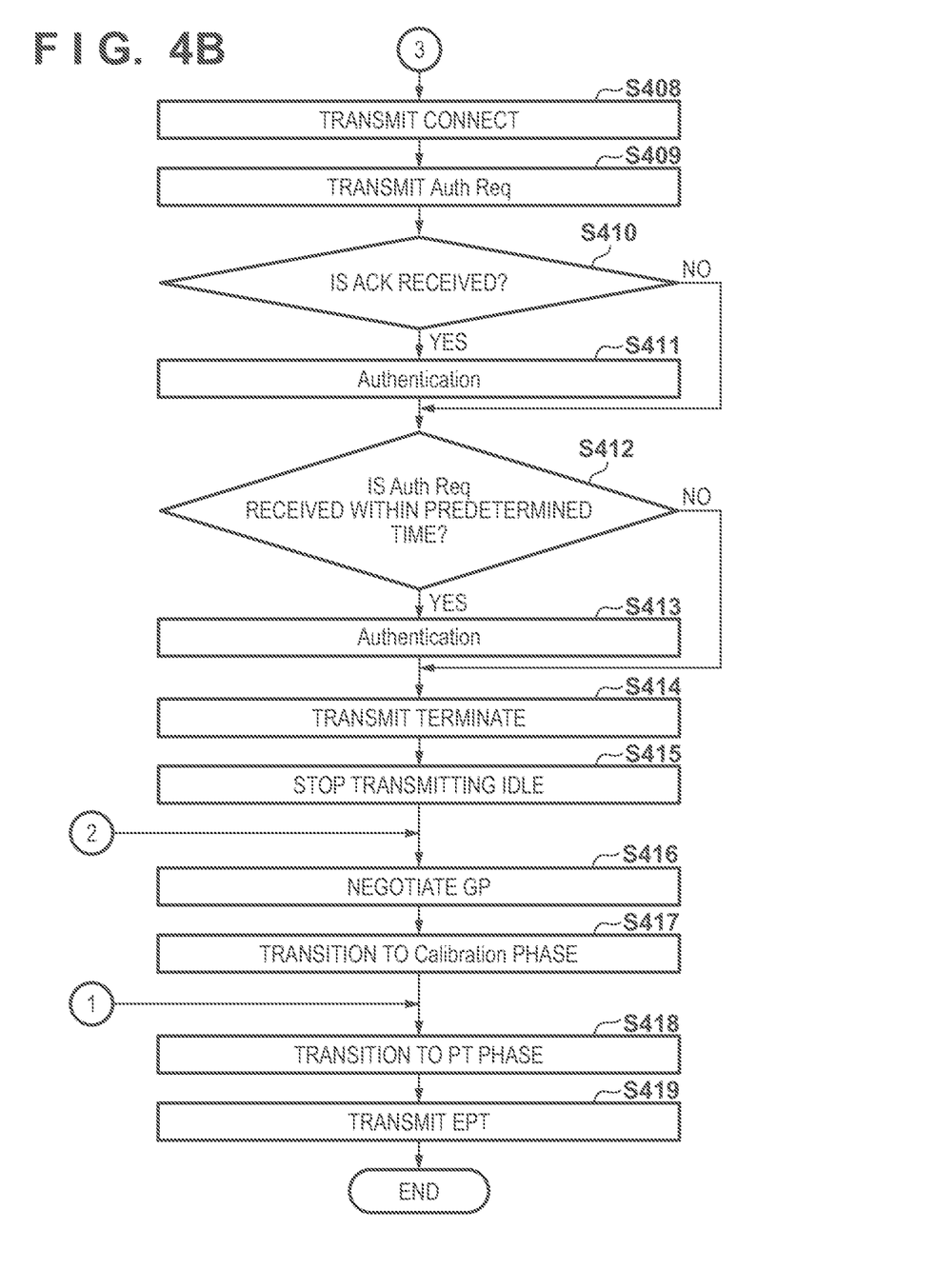
FIG. 4B is a flowchart illustrating the procedure of processing performed by the power receiving apparatus according to the embodiment.
Figure 5A:
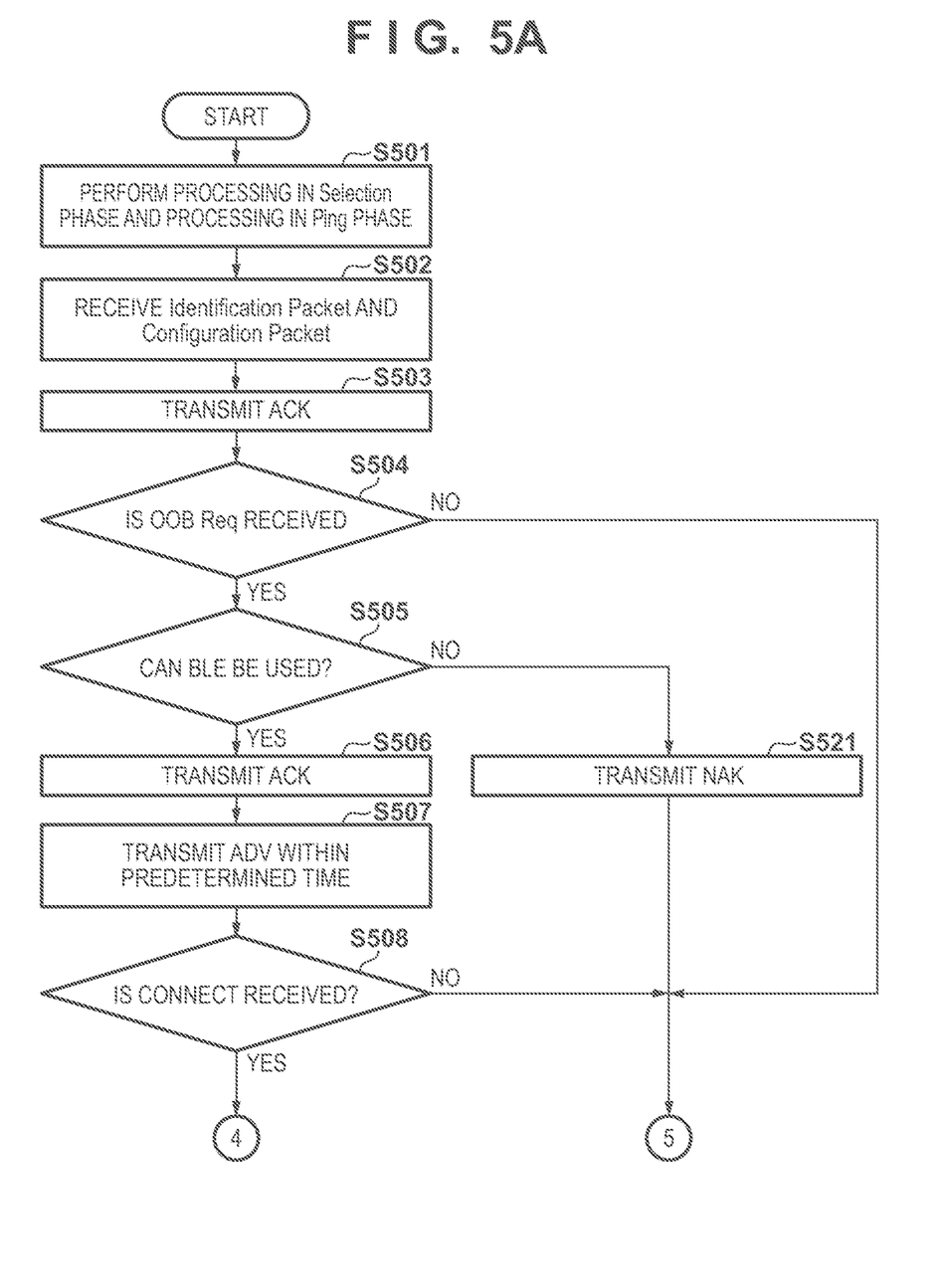
FIG. 5A is a flowchart illustrating a procedure of processing performed by the power transmitting apparatus according to the embodiment.
Figure 5B:
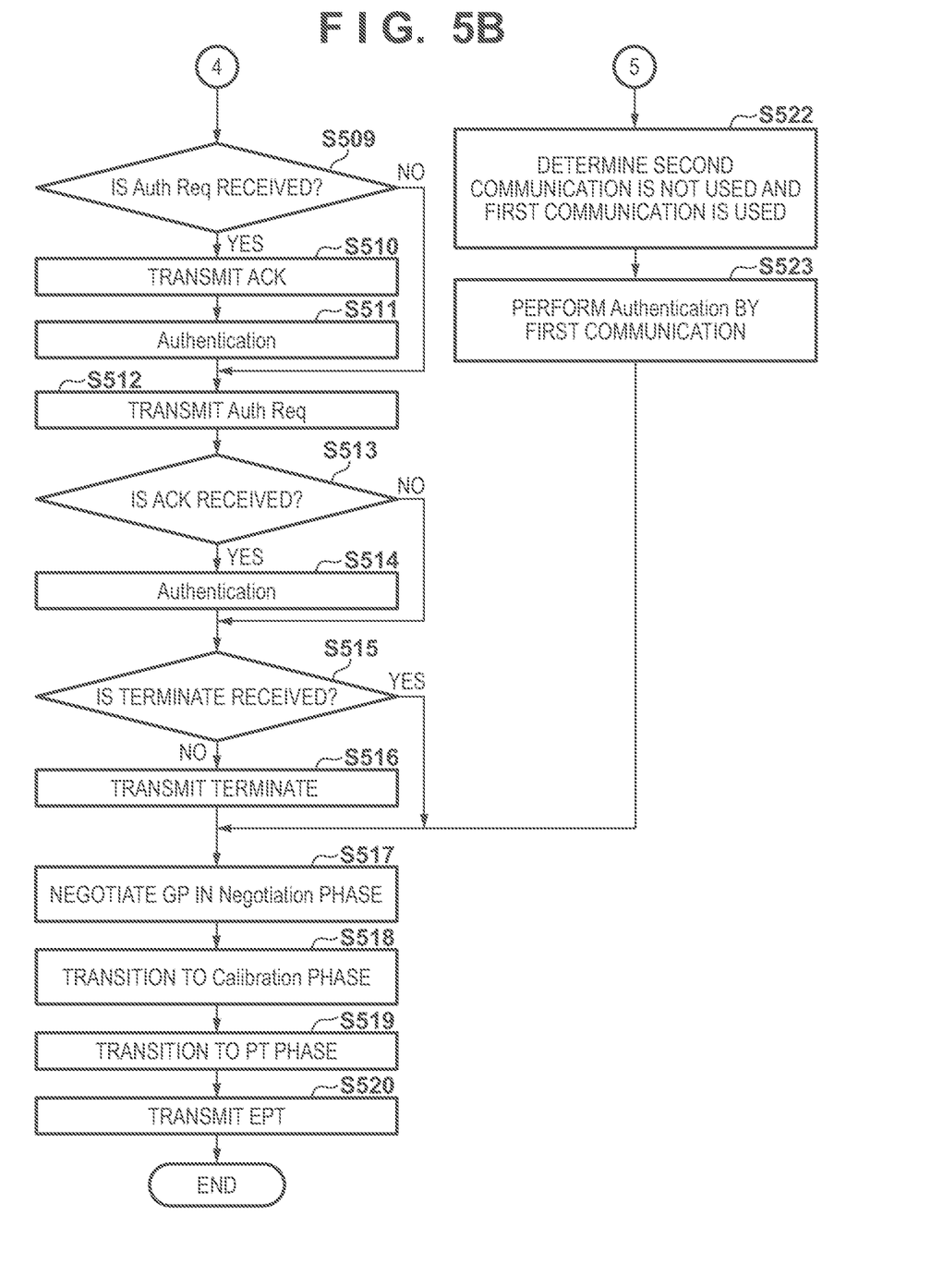
FIG. 5B is a flowchart illustrating the procedure of processing performed by the power transmitting apparatus according to the embodiment.

Each of the flowcharts shown in FIGS. 4A and 4B, FIGS. 5A and 5B, and FIG. 6 is started when the control unit is powered on. Note that the processing illustrated in FIGS. 4A and 4B is implemented by the control unit executing the program stored in the memory of the power receiving apparatus. The processing illustrated in each of FIGS. 5A, 5B and FIG. 6 is implemented by the control unit executing the program stored in the memory of the power transmitting apparatus.

Note that at least a part of the processing illustrated in the flowchart shown in each of FIGS. 4A and 4B, FIGS. 5A and 5B, and FIG. 6 may be implemented by hardware. If the processing is implementing by hardware, for example, a dedicated circuit may be automatically generated, by using a predetermined complier, on an FPGA from a program for implementing each step. FPGA is an abbreviation for Field Programmable Gate Array. Alternatively, a gate array circuit may be formed as in the case of the FPGA, and implemented as hardware.

According to the present disclosure, it is possible to suitably control a plurality of communication units during wireless power transfer.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A power receiving apparatus comprising:
a power receiving unit configured to wirelessly receive power from a power transmitting apparatus; and
a communication unit configured to perform communication with the power transmitting apparatus; the communication unit transmitting identification information of a power receiving apparatus at a first frequency, transmitting to the power transmitting apparatus information representing whether an authentication is available at a second frequency, and receiving from the power transmitting apparatus information representing whether an authentication is available at the second frequency.

2. The power receiving apparatus according to claim 1, further comprising:
an authentication unit configured to perform authentication using at the second frequency.

3. The power receiving apparatus according to claim 1, wherein
the information representing whether the authentication is available at the second frequency is information representing whether the power receiving apparatus can perform an authentication is available by communication that is based on a standard regarding Bluetooth Low Energy.

4. The power receiving apparatus according to claim 1, wherein
the authentication is an authentication using a certificate.

5. A power transmitting apparatus comprising:
a power transmitting unit configured to wirelessly transmit power to a power receiving apparatus; and
a communication unit configured to perform communication with the power receiving apparatus; the communication unit receiving identification information of a power receiving apparatus at a first frequency, receiving from the power receiving apparatus information representing whether an authentication is available at a second frequency, and transmitting to the power receiving apparatus information representing whether an authentication is available at the second frequency.

6. The power transmitting apparatus according to claim 5, further comprising:
an authentication unit configured to perform authentication at the second frequency.

7. The power transmitting apparatus according to claim 5, wherein
the information representing whether the authentication is available at the second frequency is information representing whether an authentication is available at Bluetooth Low Energy.

8. The power transmitting apparatus according to claim 5, wherein
the information representing whether the authentication is available at the second frequency is information representing whether an authentication is available at Bluetooth Low Energy.

9. The power transmitting apparatus according to claim 5, wherein
the authentication is an authentication using a certificate.

10. A communication method for a power receiving apparatus wirelessly receiving power from a power transmitting apparatus, the communication method comprising:
transmitting identification information of a power receiving apparatus using at a first frequency;
transmitting to the power transmitting apparatus information representing whether an authentication is available at a second frequency; and
receiving from the power transmitting apparatus information representing whether an authentication is available at the second frequency.

11. A non-transitory computer readable storage medium storing a program for causing a computer to execute a communication method for a power receiving apparatus wirelessly receiving power from a power transmitting apparatus, comprising:
transmitting identification information of a power receiving apparatus using at a first frequency;
transmitting to the power transmitting apparatus information representing whether an authentication is available at a second frequency different from the first frequency; and
receiving from the power transmitting apparatus information representing whether an authentication is available at the second frequency.

12. A communication method for a power transmitting apparatus wirelessly transmitting power to a power receiving apparatus, the communication method comprising:
receiving identification information of a power receiving apparatus at a first frequency;
receiving from the power receiving apparatus information representing whether an authentication is available at a second frequency; and
transmitting to the power receiving apparatus information representing whether an authentication is available at the second frequency.

13. A non-transitory computer readable storage medium storing a program for causing a computer to execute a communication method for a power transmitting apparatus wirelessly transmitting power to a power receiving apparatus, the communication method comprising:
receiving identification information of a power receiving apparatus at a first frequency;
receiving from the power receiving apparatus information representing whether an authentication is available at a second frequency; and
transmitting to the power receiving apparatus information representing whether an authentication is available at the second frequency.

* * * * *